United States Patent [19]

Eltvedt

[11] Patent Number: 4,741,687
[45] Date of Patent: May 3, 1988

[54] GUIDE SKIRT AND DEVICE OF COLLECTING AND STORING INJECTION MOLDED PARTS

[76] Inventor: Frank Eltvedt, 5 Lake Dr., Lake in the Hills, Ill. 60102

[21] Appl. No.: 895,504

[22] Filed: Aug. 11, 1986

[51] Int. Cl.⁴ ............................................. B29C 45/40
[52] U.S. Cl. .................... 425/441; 193/2 A; 193/25 R; 425/556
[58] Field of Search ........ 425/377, 441, 444, 436 RM, 425/537, 554, 556, DIG. 223; 249/68; 193/2 A, 15, 16, 21, 25 R, 25 S, 25 C

[56] References Cited

U.S. PATENT DOCUMENTS

| | | | |
|---|---|---|---|
| 1,232,119 | 7/1917 | Summers | 193/21 X |
| 2,310,251 | 2/1943 | Mashon | 193/25 C X |
| 3,035,682 | 5/1962 | Ferch | 193/25 R X |
| 3,776,675 | 12/1973 | Veneria | 425/444 X |
| 3,805,875 | 4/1974 | Daugherty et al. | 425/444 X |
| 3,986,811 | 10/1976 | Gunnels, Jr. | 193/25 R X |
| 4,118,168 | 10/1978 | Rees et al. | 249/68 X |
| 4,295,815 | 10/1981 | Eltvedt | 425/556 |

*Primary Examiner*—Richard L. Chiesa
*Attorney, Agent, or Firm*—Edmond T. Patnaude

[57] ABSTRACT

A guide skirt for guiding parts ejected from an injection mold to a receptacle includes side panels which are adapted to be attached at the top to respective mold-platen assemblies and are hingedly connected together so that as the mold-platen assemblies move between open and closed positions the bottom edges of the side panels move between open and closed positions causing the freshly molded parts to be retained in the skirt when the mold-platen assemblies are open and the molded parts are ejected from the mold and after a predetermined time thereafter to be released from the skirt when the mold-platen assemblies again close.

11 Claims, 1 Drawing Sheet

GUIDE SKIRT AND DEVICE OF COLLECTING AND STORING INJECTION MOLDED PARTS

The present invention relates in general to the moving of parts produced by a parts producing machine to a location below the place from which the parts are ejected from the machine, and it relates in particular to a novel guide skirt which collects said parts as they are ejected and subsequently releases them.

BACKGROUND OF THE INVENTION

U.S. Pat. No. 4,295,815 discloses a limp, flexible guide skirt which is suspended from the platens of an injection molding machine to guide the molded parts when they are ejected from the mold to a location below the molds. The guide skirt described in that patent has an inlet port at the top which opens and closes with the movement of the platens toward and away from one another. The outlet port at the bottom remains open at all times wherefor the ejected parts which drop into the skirt are guided to the desired location below the molds as soon as they are ejected and fall into the skirt.

SUMMARY OF THE INVENTION

Briefly, there is provided in accordance with the present invention a new and improved guide skirt wherein the sides of the skirt are pivotably connected together whereby the bottom outlet port also opens and closes as the platens move back and forth between open and closed positions.

In one embodiment of the invention the outlet port is completely closed when the inlet port is open to receive parts ejected from the mold and is subsequently completely opened when the molds move back together for the next molding operation. As a consequence the dropping of the parts into a receptacle or onto a conveyor is delayed from the time the parts are ejected until the start of the next molding cycle.

In a second embodiment of the invention the outlet port is only partially open when the inlet port is fully open and the outlet port is fully open when the inlet port is closed. The result is that the guide skirt of this embodiment may be used to separate the parts according to size. Those parts which are small enough to fall through the partially open outlet port immediately fall through the guide skirt when they drop from the mold cavities and are thus separated from the larger parts which are too large to fall through the partially open outlet port but which can fall through the fully open outlet port when the molds move back together.

GENERAL DESCRIPTION OF THE DRAWINGS

Further objects and advantages and a better understanding of the present invention will be had by reference to the following detailed description taken in connection with the accompanying drawings wherein:

FIG. 1 is a perspective view of a delayed drop type of guide skirt embodying the present invention;

FIGS. 2a, 2b, and 2c are schematic representations showing the guide skirt of FIG. 1 in the parts collecting and parts dropping positions; and FIGS. 3a, 3b and 3c are schematic representations of another embodiment of the invention showing the guide skirt in its different operating positions wherein the associated mold is in a closed, molding position, is in an open parts ejection position wherein the small parts are dropped through the skirt and the large parts are captured by the skirt and is again in the closed molding position where the outlet port of the skirt is fully open and releases the large parts.

DETAILED DESCRIPTION OF THE INVENTION

Figure 1:
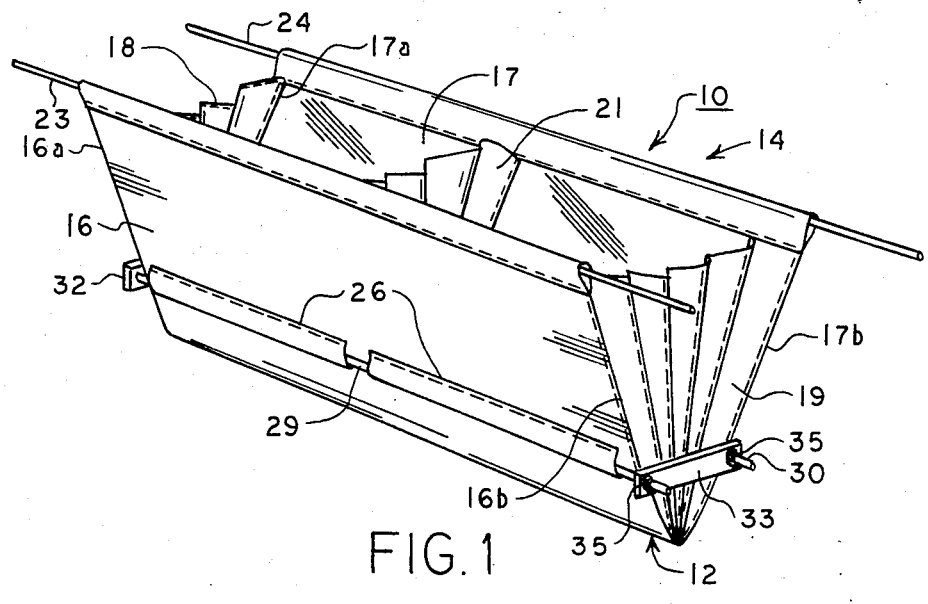

Referring now to the drawing and particularly to FIG. 1 thereof, a guide skirt embodying certain features of the present invention is generally identified at 10. In the drawing the guide skirt 10 is shown in a parts collecting position wherein the outlet 12 at the bottom is completely closed so that any parts which fall into the skirt through the inlet port 14 at the top are retained in the skirt.

Considered in detail, the guide skirt 10 may be seen to comprise a pair of generally planar side panels 16 and 17 which are joined at their respective end edges 16a, 17a and 16b, 17b by a pair of vertically pleated end panels 18 and 19 whose edges are sewn to the ends of the side panels 16 and 17. A vertically pleated center panel 21 is sewn at its edges to the side panels 16 and 17 to provide two end-to-end compartments. The bottom edges of the side panels 16 and 17 are not connected together, and as is explained more fully hereinafter the bottom edges are adapted to be moved apart to form a rectangular outlet port through which parts previously collected in the skirt 10 are dropped.

The top edges of the side panels 16 and 17 are folded back and sewn together to provide horizontal channels through which a pair of rigid mounting rods 23 and 24 extend. The rods 23 and 24 are adapted to be mounted to the bottom surfaces of mold support platens or to the molds themselves by suitable brackets as described in the said U.S. Pat. No. 4,295,815.

A plurality of fabric strips 26 are sewn to the outer faces of the side panels 16 and 17 to form horizontal channels through which a pair of rigid hinge rods 29 and 30 respectively extend. A pair of rigid bracket members 32 and 33 are provided near their ends with holes through which the rods 29 and 30 extend. Suitable fasteners, such as nuts 35, are used to hold the brackets 32 and 33 in place in proximity to the edges 16a, 16b, 17a and 17b. It will thus be seen that the rods 29 and 30 and the bracket members 32 and 33 constitute fulcrum means so that when the rods 23 and 24 are moved toward one another from the position which they occupy in FIG. 1, the bottom edges of the side panels 16 and 17 will be moved apart. The spacing between the horizontal plane containing the rods 29 and 30 and the bottom edges of the side panels 16 and 17 determines the horizontal distance between the bottom edges when the bottom outlet port is fully open. Therefore, the location at which the strips 26 are sewn to the side panels 16 and 17 is directly related to the size of the parts which will fall through the skirt.

Also, the guide skirt 10 can be mounted such that as the support rods 23 and 24 are moved back and forth between first and second positions the bottom edges of the side panels 16 and 17 are always spaced apart. In such a case, the edges of the outlet port are shifted back and forth between two spaced apart positions as is more fully described hereinafter is connection with FIGS. 3a, 3b and 3c.

Figure 2A:
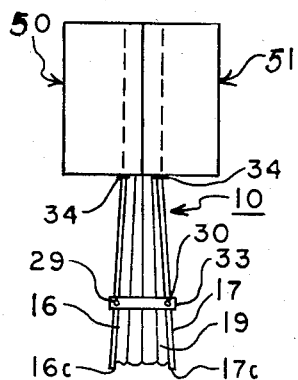
Figure 2B:
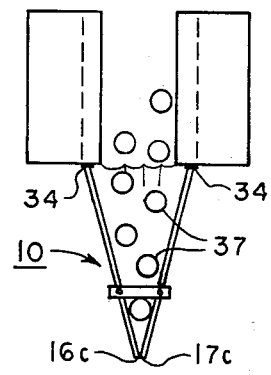
Figure 2C:
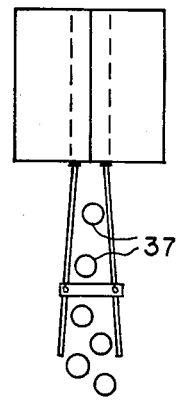

Referring to FIGS. 2a through 2c, FIG. 2a shows a pair of mold and platen assemblies 50 and 51 in the closed molding positions. A guide skirt 10 is mounted to the assemblies 50 and 51 by means of suitable brackets 34. It may thus be seen that with the mold assemblies 50 and 51 in the closed, molding position the bottom edges 16c and 17c of the side panels 16 and 17 are at their maximum spaced apart positions. Moreover, by locating the brackets 32 (not visible in FIG. 2) and 33 closer to the top edges of the side panels the distance between the bottom edges 16c and 17c will be greater when the mold assemblies are closed.

After the parts have been molded and at least partially set the mold assemblies 50 and 51 are moved apart to the position shown in FIG. 2b. When the mold assemblies 50 and 51 are in the open position the molded parts 37 are ejected from the molds and fall by gravity into the skirt 10 by virtue of the fact that the inlet or mouth of the skirt 10 is wide open. Because the edges 16c and 17c are closer together than the minimum dimensions of the parts 37, the parts 37 are retained by the skirt 10.

Upon completion of the parts ejection operation the mold assemblies 50 and 51 are moved back together to the mold closed position which, as shown in FIG. 2c, pivots the side panels 16 and 17 about the horizontal axes of the rods 23 and 24 to move the bottom edges 16c and 17c to the fully spaced apart position whereupon the previously collected parts 37 are dropped from the skirt 10. The operation of the skirt 10 thus provides a substantial delay between the time when the parts 37 are ejected and the time when the parts are actually released from the skirt.

Figure 3A:
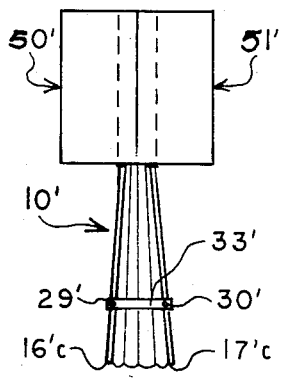
Figure 3B:
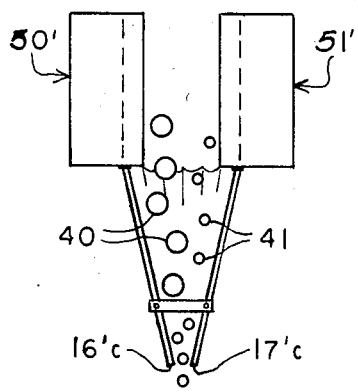
Figure 3C:
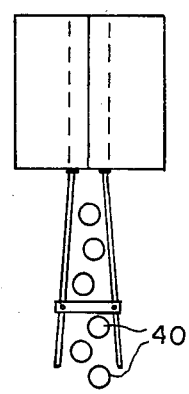

Referring to FIGS. 3a through 3c it may be seen that the guide skirt of the present invention may be used to separate the parts ejected from the molds according to size. As there shown, a guide skirt 10' is attached to a pair of platen and mold assemblies 50' and 51' in the same manner as the guide skirt 10 is attached to the platen-mold assemblies 50 and 51. The guide skirt 10' includes a pair of hinge brackets 33' to which the side panels of the guide skirt 10' are pivotally attached by a pair of horizontal rods 29' and 30'. The bracket 33' is positioned between the top and bottom edges of the side panels so that when the mold-platen assemblies are in the spaced apart open position shown in FIG. 3b the bottom edges 16'c and 17'c are spaced a substantial distance apart. Where the parts being molded are of two different sizes such, for example, as large balls 40 and small balls 41 as shown in FIG. 3b, and the space between the edges 16'c and 17'c is greater than the maximum dimension of the small parts 41 the small parts will immediately drop from the guide skirt while the large parts 40 will be retained therein. Then when the mold assemblies again close to the position shown in FIG. 3c the large parts 40 are released.

As shown in FIG. 1, the guide skirt 10 has intermediate wall or panel 21 which separates the skirt 10 into two sections, one at one end and one at the other. The skirt 10' may include a similar intermediate panel and the mold may be constructed so that the small parts 41 drop from the mold into one of the skirt sections and the large parts 40 drop into the other section. With such a configuration the large parts cannot block the outlet opening at the bottom of the skirt 10' before all of the small parts have fallen out.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed as new and desired to be secured under Letters Patent of the United States is:

1. A parts producing machine having a device for collecting and subsequently dropping parts ejected from said machine, said machine including a pair of platens mounted for relative movement toward and away from one another between a first position wherein said platens are disposed in mutual proximity and a second position wherein said platens are remotely disposed, said parts being ejected into the space between said platens when said platens are in said second position, comprising in combination first and second side wall members each having an upper edge, a bottom edge and two side edges, two flexible end wall members respectively disposed between the side edges of said side wall members, said top edges of side wall members being respectively connected to said platens so as to be moved toward and away from one another as said platens move between said first and second positions, and fulcrum means pivotally connected to each of said side wall members at locations spaced from said top and bottom edges to cause said bottom edges to move toward one another as said platens move away from one another.

2. A device according to claim 1 wherein
said side wall members and said end wall members are formed of a limp, flexible material.

3. A device according to claim 1 wherein said fulcrum means comprises
first and second rigid members extending parallel to the direction of movement of said platens,
a pair of rods extending in a horizontal direction between said rigid members along the sides of respective ones of said side wall members, and
connector means connecting said rods to said side wall members.

4. A device according to claim 3 wherein said connector means comprises
a plurality of flaps sewn to the external sides of said side wall members to form channels through which said rods extend.

5. A device according to claim 4 wherein
said side wall members are dimensioned from top to bottom such that said bottom edges are in substantial mutual abutment when said platens are in said second position.

6. A device according to claim 4 wherein
said side wall members are dimensioned from top to bottom such that said bottom edges are substantially spaced apart when said platens are in said second position.

7. A device according to claim 1 wherein
said side wall members are dimensioned from top to bottom such that said bottom edges are spaced a substantial distance apart when said platens are in said second position.

8. A device according to claim 1 wherein
said side wall members are dimensioned from top to bottom such that said bottom edges are in substantial abutment when said platens are in said second position.

9. A device according to claim 1 wherein
said end wall members are trapezoidal in shape.

10. A device according to claim 9 wherein
said end wall members are pleated from top to bottom.

11. A device according to claim 1 comprising
a vertically pleated, flexible panel extending between said side wall members at a location spaced from said end wall members.

* * * * *